PROCESS FOR MAKING A MAGNETIC FILM
Filed Dec. 20, 1965
FIG. 1
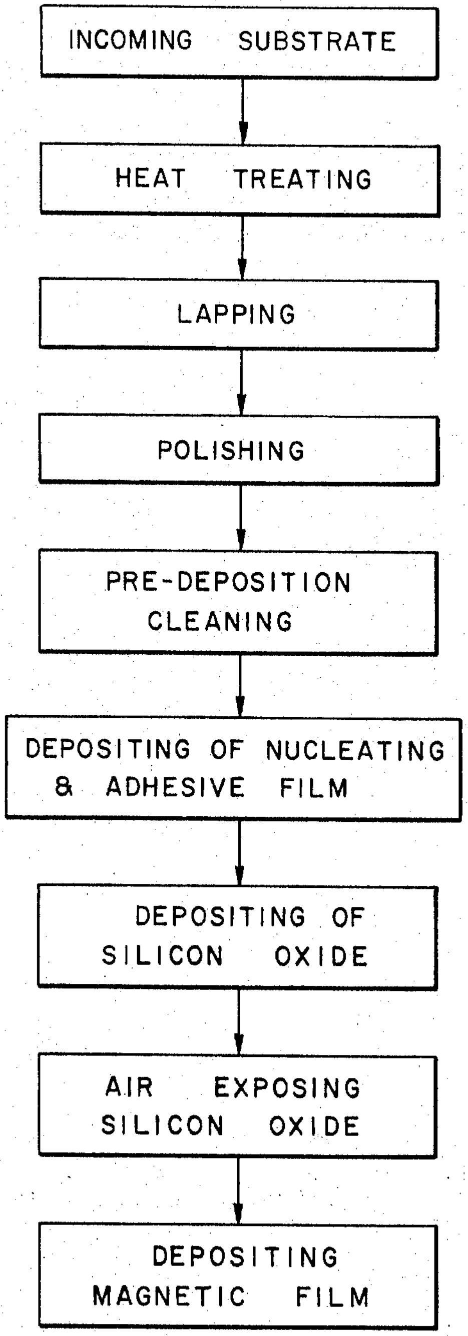
FIG. 2
| | PLATE POSITION | $H_o$ | $HK_o$ | $\alpha 90$ | $\beta$ |
|---|---|---|---|---|---|
| A | 1 | 4.8 | 5.2 | 4° | +0.7° |
| | 2 | 5.0 | 5.4 | 4° | +0.9° |
| | 3 | 5.0 | 5.2 | 4° | +0.5° |
| | 4 | 5.0 | 5.4 | 5° | -0.3° |
| | 5 | 4.7 | 5.1 | 5° | +0.4° |
| B | 1 | 3.0 | 5.1 | 1° | +0.4° |
| | 2 | 3.0 | 4.9 | 1° | +0.6° |
| | 3 | 2.9 | 5.0 | 1° | +0.3° |
| | 4 | 2.9 | 4.9 | 1° | +0.5° |
| | 5 | 3.0 | 4.8 | 1° | +0.9° |
| C | 1 | 5.0 | 5.4 | 6° | +0.1° |
| | 2 | 5.0 | 5.2 | 4° | +0.4° |
| | 3 | 5.0 | 5.3 | 4° | +0.1° |
| | 4 | 5.0 | 5.4 | 3° | -0.1° |
| | 5 | 4.8 | 5.3 | 3° | +0.2° |
| D | 1 | 3.4 | 4.8 | 2° | -0.5° |
| | 2 | 3.4 | 4.8 | 2° | +0.3° |
| | 3 | 3.4 | 4.7 | 1° | -0.4° |
| | 4 | 3.4 | 4.8 | 1° | 0.0° |
| | 5 | 3.3 | 4.8 | 1° | +0.1° |
FIG. 3
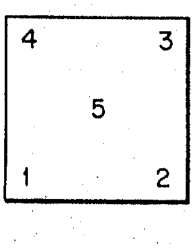
INVENTORS
LEE J. BOUDREAUX
BARRY L. FLUR
KENNETH B. SCOW
BY Bertram H. Mullen
ATTORNEY United States Patent Office 3,470,020 Patented Sept. 30, 1969

3,470,020
PROCESS FOR MAKING A MAGNETIC FILM

Lee J. Boudreaux, Phoenix, Ariz., Barry L. Flur, Burlington, Vt., and Kenneth B. Scow, Wappingers Falls, N.Y., assignors to International Business Machines Corporation, Armonk, N.Y., a corporation of New York Filed Dec. 20, 1965, Ser. No. 515,118
Int. Cl. C23c *13/02;* B44d *1/12*
U.S. Cl. 117—236 8 Claims

ABSTRACT OF THE DISCLOSURE

A method of making magnetic film device by depositing a silicon monoxide layer on a supporting substrate, then exposing the silicon monoxide layer to air or other oxidizing atmosphere prior to depositing the magnetic film device. As a result of the exposure to air or other oxidizing atmosphere, the oxidation state of the silicon monoxide is altered. Use of this process gives a 30 to 50 percent reduction in wall motion threshold ($H_o$), dispersion ($\alpha_{90}$), and skew ($\beta$), in the magnetic film devices thus produced.

This invention relates to magnetic thin films and, in particular, to an improved process for making magnetic thin films of the type finding application as storage and switching elements in computers.

Though a broad range of magnetic devices presently find extensive use in data processing and computer machines today, storage elements employing magnetic thin films are assuming a predominant position in the industry's research and development efforts. A primary reason why attention is being focured on magnetic thin films is that these films have the capability to undergo a magnetization reversal by the process of coherent spin rotation. With this phenomenon, magnetization, or, in the alternative, the magnetic dipole alignment rotates through an angle of 90° in the order of nanoseconds ($10^{-9}$ seconds). Nickel-iron and generally the nonmagnetostrictive forms of Permalloy comprise the bulk of magnetic film materials from which such storage elements are formed; these films are deposited by plating, vacuum deposition, or cathode sputtering, to thicknesses of up to 10,000 A. but in most instances to thicknesses of less than 1000 A. The film is grown on a substrate to these thicknesses in the presence of an orienting field to achieve uniaxial anisotropy, i.e., a preferred or easy axis of remanent magnetization.

The advantages of the magnetic thin film hold promise of commercial realization in magnetic storage and switching applications wherein both the parallel and perpendicular drive modes are used to operate these devices. In their former mode, two drive lines are positioned parallel but off the easy axis of uniaxial anisotropy, that is, the easy axis. In the latter mode, the perpendicular drive mode, two sets of drive lines are also superimposed over the magnetic thin film but, in this instance, these sets of drive lines are in quadrature with one another. One set of these drive lines is disposed parallel to the easy axis of magnetization and is generally known as the word line; the second set that is transverse to the first set is generally known in the art as the bit drive lines, and this set of drive lines is positioned parallel to the hard direction of magnetization. Applications of an electric current, more generally designated a word pulse, along the word lines induces a field in a hard direction, which field rotates the magnetic dipoles through an angle of 90° either in a clockwise or counter-clockwise direction, depending upon the initial state of magnetization. The rotation of the dipoles gives rise to either a positive or negative signal in the sense lines, which may be the same as the bit line, or may be a third set of lines that is selectively placed about the device. Application of an electric current, more conventionally called a bit pulse, along the bit lines results in a field in the easy direction. The bit pulses are applied in time sequence such that the leading edge of the bit pulse overlaps the trailing edge of a word pulse. Thus the bit pulse determines the rest state of the magnetization and therefore, to a great extent, controls the writing process.

But, the resultant properties and degree of reliability available with magnetic thin film devices are dictated to a great extent, if not entirely, by a number of considerations external to the film itself. A rather influential factor in this regard is the substrate which is primarily utilized as a mechanical support for the film, but, of late, has also assumed additional functions of an electrical and thermal nature. The substrate material, its crystallographic state (that is, whether it is amorphous, polycrystalline, or a single crystal), the substrate surface topography and profile, and the surface contamination and impurities, are of particular significance and play a dominant role in determining the resultant magnetic device properties. While all the mechanisms and phenomena which occur on a substrate surface to influence the nature of the magnetic properties exhibited by the film are not fully understood, a working hypothesis based upon theoretical and experimental consideration has been advanced. It is found that surface roughness of the substrate on a microscopic scale appears as a nonuniform distribution of hills and valleys which provide areas for local demagnetizing fields to develop during the operation of the magnetic thin film device. In addition, substrate roughness, it has been found, affects the film growth by a subtle transfer of crystalline properties by the process of epitaxy. Now, since the substrate surface has a nonuniform profile, the crystallographic relationship between substrate and film changes from substrate region to region; this brings into play nonuniform localized anistotropy forces. Normally, the greater the substrate roughness, the greater the coercive force, skew, dispersion and the greater is the scatter in the values of these parameters over the magnetic film surface. High values and a large spread in magnitude of these magnetic parameters over the surface of the film adversely affects power requirements, reliability, cost, and results in an inoperable device, or one that is not commercially competitive with other alternatives.

One technique that the present state of the art has found improves magnetic thin film devices entails pretreating the substrate to reduce the roughness profile, cleaning and freeing the substrate of all contaminants and impurities, depositing an amorphous material over the substrate, and, thereafter, depositing the magnetic thin film over the freshly created amorphous surface. By creating a fresh amorphous surface prior to the deposition of the magnetic thin film, the introduction of impurities is minimized and the influence of a crystalline structure on the magnetic properties of the film avoided. A material that is presently used in the art to satisfy these requirements is silicon monoxide, see B. I. Bertelsen, Journal of Applied Physics, vol. 33, No. 6, pp. 2026–2030, June 1962. Now, while a freshly deposited silicon monoxide layer enhances reproducibility, reduces substrate surface roughness, and generally leads to a better magnetic thin film device than available prior to the implementation of the use of the same, non-uniformity of magnetic properties over the film surface is still encountered. Accordingly it has been an object of considerable research, therefore, to provide magnetic thin films exhibiting uniformity of magnetic properties over the surface of the type that find application as storage and switching devices in computer applications.

It is the principal object of this invention to provide an improved process for forming magnetic thin films of the type finding utilization as storage and switching devices in data processing and computer machines.

It is a further object of this invention to provide an improved magnetic thin film.

It is yet another object of this invention to provide an improved process for producing magnetic thin film elements exhibiting a high degree of magnetic uniformity.

It is yet another object of this invention to provide an economical and commercially feasible process for making magnetic thin films for use in data processing and computer machines.

What has now been discovered is that the aforementioned objects, features and advantages are realized in accordance with the invention by altering the oxidation state of the silicon monoxide layer, prior to placing a magnetic thin film thereover. This is most surprising since it was previously believed that higher ordered silicon oxides other than the monoxide were not sufficiently amorphous nor chemically active enough to have the desired beneficial effect on the magnetic thin film. The prior art, to avoid contamination or any change in the silicon monoxide layer, deposited the amorphous material immediately before condensing the magnetic thin film over the same, and the entire process was performed in a closed vacuum system; the closed system was used for the reasons heretofore given and, in part, to avoid having the freshly deposited silicon monoxide come in contact with air or water. It was felt that were air or water to react with the silicon monoxide, the nature of the stress in the silicon monoxide would shift from tensile to compressive and lead to the peeling or lifting of the silicon oxide from the substrate.

Briefly, in accordance with the present invention, the substrate upon which the magnetic thin film is deposited is pretreated to remove contaminants and to reduce the substrate roughness profile. A nucleation and adhesive layer, the purpose of which is to bond the subsequent silicon oxide to the substrate, is then placed over the substrate surface. Silicon monoxide is then deposited over the nucleation and adhesive layer. Once the silicon monoxide is on the substrate, it is exposed to air or another oxidizing atmosphere for a sufficient period of time to alter the oxidation state of the silicon oxide. The magnetic thin film is then deposited over the silicon oxide. In this manner, greater uniformity of magnetic properties is achieved.

The foregoing and other objects, features and advantages of the invention will be apparent from the following more particular description of a preferred embodiment of the invention as illustrated in the accompanying drawings.

In the drawings:

FIGURE 1 is a flow chart representing various steps of the invention utilized in the formation of a magnetic thin film.

FIGURE 2 is a table illustrating the effect of air exposure on a magnetic thin film compared to a magnetic thin film formed without the use of the same.

FIGURE 3 depicts a square film surface whereon the numerals represent the regions where the magnetic properties of the thin film were measured to evaluate the uniformity as represented in the table of FIGURE 2.

Referring now to FIGURE 1 of the drawings, there is indicated therein in block diagram the various operations carried out in the practice of this invention. The operations are now described with reference to a metal substrate. But, it is to be realized that other substrates such as glass are amenable to the process and the advantages derived therefrom. Where the substrate is metal, such as rolled silver-copper alloy plate containing 80 weight percent silver and 20 weight percent copper, the initial steps in the preparation entail machining the rolled plate to the desired substrate size. The substrate plate is then heat treated to remove any internal stress that may have been introduced as a result of the machining operation. These substrates are heat treated in a protective atmosphere such as dry forming gas for about four hours;

the substrate is slowly cooled in a protective atmosphere to room temperature. This is accomplished by furnace cooling in the dry forming gas atmosphere to ambient temperature. While forming gas is used for convenience, any protective gas is usable provided it is not oxidizing to the substrate.

The substrate plates are then rough-lapped in a planetary lapper using 0.4 micron alundum abrasive to reduce the plate thickness to the desired dimension of about 0.081 inch and to insure the required planar surface. This is followed by fine lapping on a second planetary lapper using 0.3 micron alundum to produce a flat specular finish. The substrate is then polished on a vibratory polisher to produce a scratch-free surface. Once the polishing is completed, the substrate then undergoes a predeposition cleaning. This involves cleaning the substrate with ultrasonic agitation in two baths. The first is acetone and is used to remove organic contaminants and the second bath is alcohol which removes other remaining contaminants. The substrate plates are removed slowly from the alcohol bath in order to avoid spotting by droplet evaporation. The substrates are then in condition to receive the several deposits upon the surface.

The first layer that is deposited is the nucleation and adhesive layer, the purpose of which is to bond the subsequent silicon oxide layer to the substrate. Reference may be had to U.S. Patent 3,024,761 and 3,110,620 of B. I. Bertelsen for the general type of apparatus that may be used to deposit the subsequently described layers and films. While it is preferred to use chromium for this layer, other materials may be used such as silver, aluminum, or the like. The chromium is deposited in a vacuum chamber at a pressure of about $10^{-5}$ torr. During the deposition of the chromium, the substrate is maintained at a temperature between 300° to 450° C. but preferably 400° C and the chromium deposited at a rate of about 10 to 15 A. per second to a thickness between 400 to 1000 A. but preferably 600 A.

Silicon monoxide is then deposited over the chromium layer. As with the chromium, the pressure in the vacuum chamber is maintained between $10^{-5}$ to $10^{-7}$ torr and the substrate is heated to a temperature of about 400° C. The silicon monoxide is condensed onto the heated substrate at a rate of about 300 to 350 A. per second to a thickness between 1 to 4 microns and preferably of about 2 microns. The silicon monoxide is then exposed to air or another oxidizing atmosphere for a period sufficient to alter the oxidation state of the amorphous layer. This is performed by removing the substrate from the vacuum chamber and permitting air to come in contact with the silicon monoxide at room temperature. While about a half minute is consumed in doing this, there is, in essence, no lower limit for the exposure save that required for the air to come in contact with the film. After this the magnetic thin film is deposited over the silicon oxide layer.

The magnetic thin film, which is preferably a nickel-iron-cobalt alloy, consists of about 78 to 79 percent by weight nickel, 18 to 19 percent by weight iron with the balance cobalt. It is to be recognized that other Permalloy compositions containing from 10 to 35 percent iron and 65 to 90 percent nickel may also be used. The nickel-iron-cobalt is deposited in vacuum at a pressure of about $3\times10^{-6}$ torr with the substrate heated to a temperature of about 400° C., as with the previous depositions. A uniform magnetic field of about 40 oersteds is provided by magnetic coils located outside the vacuum chamber, the purpose of which is to induce the desired anisotropy. The magnetic thin film is deposited at the rate of about 20 A. per second to a thickness between 700 to 1000 A.

Uniformity of these magnetic thin films and their performance capabilities as a magnetic thin film storage device is evaluated from such magnetic parameters as coercive force ($H_o$), anisotropy field ($H_{ko}$), dispersion ($\alpha 90$), and skew ($\beta$). These parameters as an evaluation index are well known in the art and widely described in the literature. For example, see the article by H. J. Kump entitled The Anisotropy Fields Angular Dispersion of Permalloy Films, 1963 Proceedings of The International Conference on Non-Linear Magnetics, Article 12–5. But, to facilitate the discussion, the terminology is briefly reviewed.

$H_o$—Coercive force is a measure of the easy direction field necessary to start a domain wall in motion. It is a threshold for wall motion switching.

$H_{ko}$—Anisotropy field may be thought of as the force required to rotate the magnetization from a preferred direction of magnetization to the hard direction.

$\alpha 90$—Dispersion is a measure of the variation of the easy axis of magnetization in microscopic regions of the film.

$\beta$—Skew is a measure of the deviation of the average easy axis of magnetization from the intended easy axis of magnetization on a macroscopic scale.

Each of these parameters is presented in the table of FIGURE 2. The plate position designated 1, 2, 3, 4, and 5 refers to the edge points and center point respectively of a 2 x 2 inch square film specimen such as shown in FIGURE 3. Point 1 designates the bottom left corner of the film, point 2 the bottom right corner of the film, point 3 the upper right corner of the film, point 4 the top left corner of the film and point 5 the center position of the film. By measuring $H_o$, $H_{ko}$, $\alpha 90$, and $\beta$ at each of these points, the uniformity of the magnetic thin film is readily evaluated.

In FIGURE 2, examples A and C refer to magnetic thin films formed in the conventional manner, that is, without the benefit of an air exposure; examples B and D refer to magnetic thin films formed with the benefit of the present invention. Those films formed with the air exposure exhibit greater uniformity and lower values for the magnetic parameters than those formed without the same. Note that with the present invention, the average wall motion threshold ($H_o$) and average dispersion ($\alpha 90$) is reduced by a factor of about 30%, while skew ($\beta$) is reduced to a factor between 40% to 50%.

While the invention has been particularly shown and described with reference to preferred embodiments thereof, it will be understood by those skilled in the art that various changes in form and details may be made therein without departing from the spirit and scope of the invention.

What is claimed is:

1. In the method of making a magnetic film element of the type finding application as storage and switching elements, the steps of:

pretreating a substrate to remove contaminants and to reduce the substrate roughness profile;

vacuum depositing a nucleation and adhesive layer over said substrate;

vacuum depositing a silicon monoxide layer over said nucleation and adhesive layer;

the deposition of both the nucleation and adhesive layer and the silicon monoxide layer being carried out while said substrate is heated to a temperature between 300°–450° C.;

exposing the deposited silicon monoxide layer to an oxidizing atmosphere to alter the oxidation state of the silicon monoxide; and, thereafter depositing a magnetic film over said altered silicon monoxide.

2. The method of claim 1 wherein said substrate is metal and further said pretreatment entails heat treating said substrate in a protective atmosphere to remove the internal stresses within said substrate and thereafter slowly cooling said substrate to room temperature in said protective atmosphere.

3. The method of claim 2 wherein the oxidizing atmosphere is air and the magnetic film comprises nickel and iron.

4. The method of claim 1 wherein the oxidizing atmosphere is air.

5. The method of claim 1 wherein the magnetic film comprises nickel and iron.

6. In the method of making a magnetic film storage and switching device by vacuum depositing a silicon monoxide layer on a supporting substrate and thereafter vacuum depositing a magnetic film over the silicon monoxide layer, the improvement comprising exposing the vacuum deposited silicon monoxide layer to an oxidizing atmosphere to alter the oxidation state of the silicon monoxide prior to vacuum depositing the magnetic film.

7. The method of claim 6 wherein the oxidizing atmosphere is air.

8. The method of claim 7 wherein the magnetic film comprises nickel and iron.

References Cited

UNITED STATES PATENTS

| | | | |
|---|---|---|---|
| 2,641,954 | 6/1953 | Scharf et al. | 117—106 |
| 2,904,450 | 9/1959 | Irland et al. | 117—71 |
| 2,907,672 | 10/1959 | Irland et al. | 117—71 |
| 3,161,946 | 12/1964 | Birkenbeil | 117—236 |
| 3,303,116 | 2/1967 | Maissel et al. | 117—239 |

WILLIAM D. MARTIN, Primary Examiner

B. D. PIANALTO, Assistant Examiner

U.S. Cl. X.R.

117—71, 106, 107, 239, 240